United States Patent
Jones

(10) Patent No.: US 10,300,750 B2
(45) Date of Patent: May 28, 2019

(54) TYRE REMOVING AND INSTALLATION HAND TOOL

(71) Applicant: Simon Patrick Jones, Cleveland (GB)

(72) Inventor: Simon Patrick Jones, Cleveland (GB)

(73) Assignee: Simon Patrick Jones, Cleveland (GB)

( * ) Notice: Subject to any disclaimer, the term of this patent is extended or adjusted under 35 U.S.C. 154(b) by 221 days.

(21) Appl. No.: 15/501,075

(22) PCT Filed: Aug. 6, 2015

(86) PCT No.: PCT/GB2015/052274
§ 371 (c)(1),
(2) Date: Feb. 1, 2017

(87) PCT Pub. No.: WO2016/024092
PCT Pub. Date: Feb. 18, 2016

(65) Prior Publication Data
US 2017/0253095 A1  Sep. 7, 2017

(30) Foreign Application Priority Data

Aug. 12, 2014 (GB) .................................. 1414255.8
Apr. 21, 2015 (GB) .................................. 1506767.1

(51) Int. Cl.
*B25D 1/00* (2006.01)
*B60C 25/01* (2006.01)
*B60C 25/02* (2006.01)

(52) U.S. Cl.
CPC ................ *B60C 25/02* (2013.01); *B25D 1/00* (2013.01); *B25D 2250/005* (2013.01); *B60C 25/01* (2013.01)

(58) Field of Classification Search
CPC ... B60C 25/01; B60C 25/02; B25D 2250/005; B25D 1/00
See application file for complete search history.

(56) References Cited

U.S. PATENT DOCUMENTS 929,905 A    8/1909  Webber
1,330,648 A * 2/1920  Nickle .................... B60C 25/02
                                               157/1.28
(Continued)

FOREIGN PATENT DOCUMENTS

BE      434738 A    6/1939
EP    1270280 A2    1/2003
(Continued)

OTHER PUBLICATIONS

International Preliminary Report on Patentability for application No. PCT/GB2015/052274 dated Feb. 23, 2017.
(Continued)

*Primary Examiner* — David B. Thomas
(74) *Attorney, Agent, or Firm* — Workman Nydegger

(57) ABSTRACT

A hand-tool is provided for installing and removing a tire, comprising a substantially elongated body member having a longitudinal axis, the body member further comprising a handle portion (102); a first engagement portion (108), arranged at a first end of said handle portion, adapted to operably engage with a first flange of opposed first and second rim flanges of a wheel, so as to form a fulcrum on the contact point with the first flange; a second engagement portion (112), spaced apart at a predetermined distance in a direction away from said first engagement portion along said longitudinal axis, adapted to abuttingly engage with a rim-overlapping bead portion of a tire.

19 Claims, 8 Drawing Sheets

(56) References Cited

U.S. PATENT DOCUMENTS

| | | | |
|---|---|---|---|
| 1,372,796 A | | 3/1921 | Bjomlie |
| 1,392,591 A | * | 10/1921 | Mobley .................. B60C 25/02 157/1.22 |
| 1,439,381 A | | 12/1922 | Safstrom |
| 1,791,681 A | * | 2/1931 | Morgan .................. B60C 25/02 157/1.28 |
| 2,009,338 A | * | 7/1935 | Brown .................... B60C 25/02 157/1.28 |
| 2,061,274 A | * | 11/1936 | Horn ....................... B60C 25/02 157/1.26 |
| 2,333,880 A | * | 11/1943 | Ohlsen ................... B60C 25/02 157/1.28 |
| 2,481,764 A | * | 9/1949 | Luton ..................... B60C 25/02 157/1.26 |
| 2,492,329 A | * | 12/1949 | Smith ..................... B60C 25/02 157/1.28 |
| 2,582,869 A | * | 1/1952 | Honeycutt .............. B60C 25/02 157/1.26 |
| 9,610,811 B2 | * | 4/2017 | Wu ......................... B60C 29/00 |

FOREIGN PATENT DOCUMENTS

| | | |
|---|---|---|
| FR | 506081 | 8/1920 |
| FR | 543526 | 9/1922 |
| FR | 724232 A | 4/1932 |
| FR | 878330 A | 1/1943 |
| FR | 908320 A | 4/1946 |
| FR | 5867111 | 2/1999 |
| GB | 143403 A | 5/1920 |
| GB | 191134 | 1/1923 |
| GB | 200037 A | 7/1923 |

OTHER PUBLICATIONS

United Kingdom Search Report for application No. GB1414255.8 dated Jan. 27, 2015.
International Search Report and Written Opinion for application PCT/GB2015/052274 dated Oct. 29, 2015.

* cited by examiner

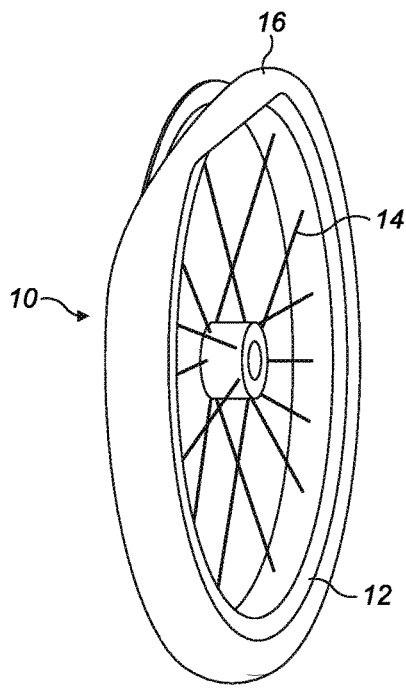
FIG. 1
Prior Art
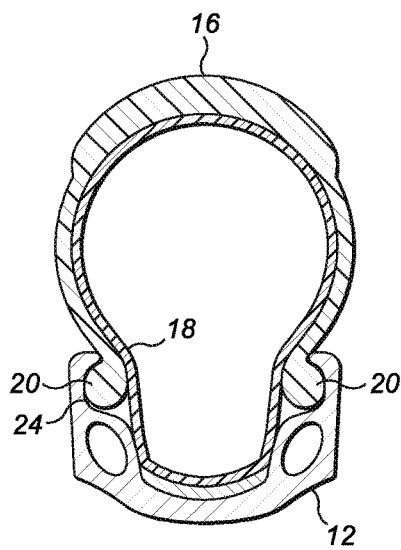 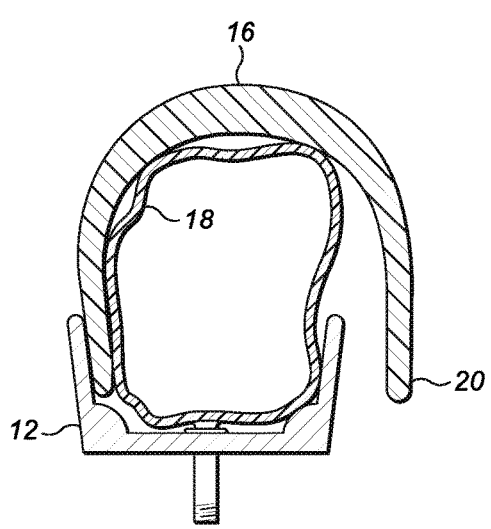
FIG. 2(a)
Prior Art
FIG. 2(b)
Prior Art

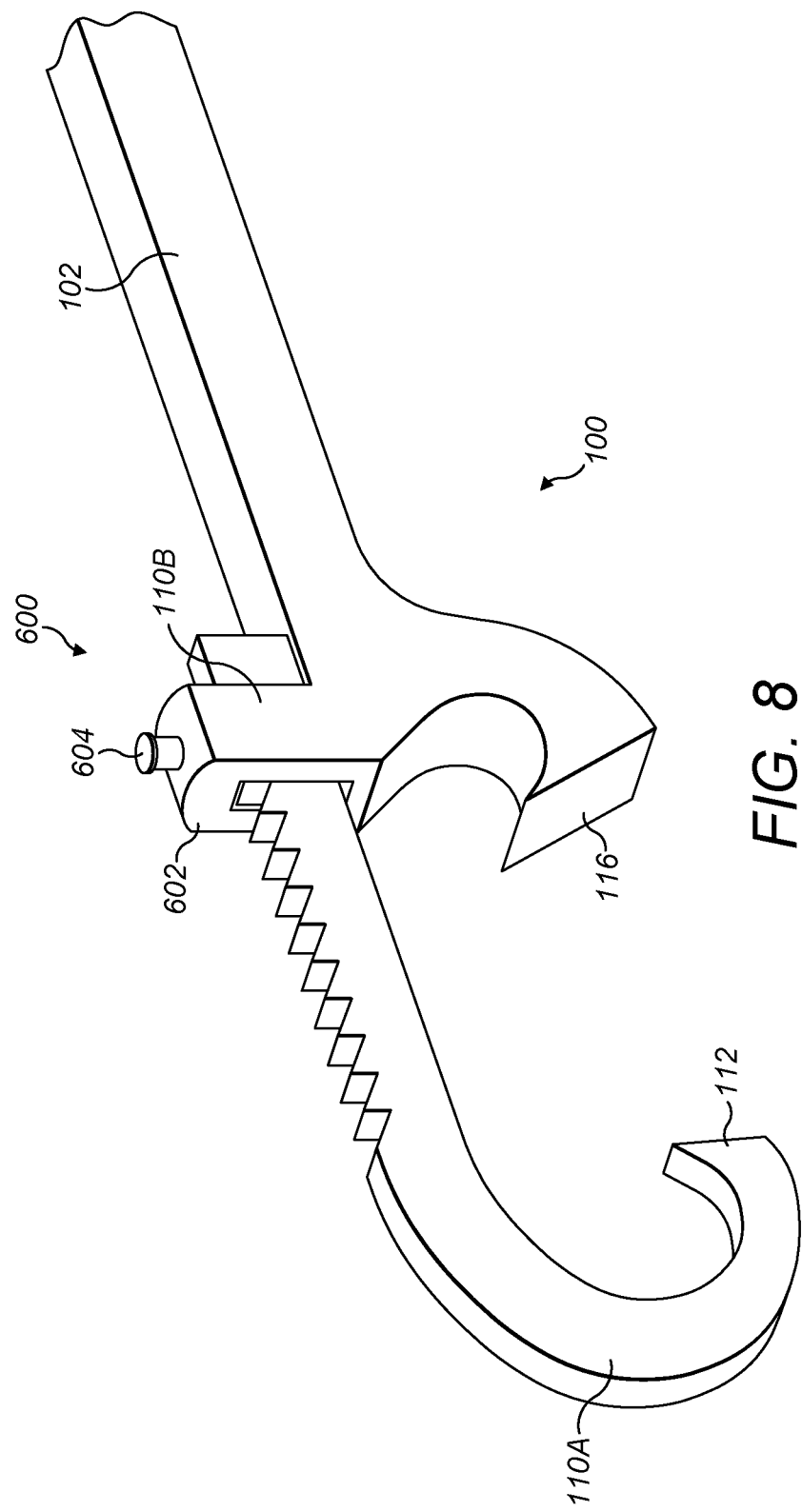

TYRE REMOVING AND INSTALLATION HAND TOOL

The present invention relates generally to the field of bicycle tools and more particularly, to a tool for facilitating the removal and installation of tyres mounted to a rim, such as, for example, bicycle tyres.

INTRODUCTION

A typical modern wheel, such as a bicycle wheel, has a metal hub, wire tension spokes and a metal or carbon fibre rim which holds a pneumatic rubber tyre, usually including an inner tube.

The rim is commonly a metal extrusion that is butted into itself to form a hoop, though may also be a structure of carbon fibre composite. Some wheels use both an aerodynamic carbon hoop bonded to an aluminium rim on which to mount conventional bicycle tyres. Rims designed for use with rim brakes comprise opposing flanges so as to provide a smooth parallel braking surface.

Most bicycle rims are so called "clincher" rims for use with clincher tyres. These tyres have a wire or aramid (Kevlar® or Twaron) fibre bead that interlocks with the flanges inside the rim. A separate airtight inner tube enclosed by the rim supports the tyre carcass and maintains the bead lock. One of the great advantages of this system is that the inner tube can be easily accessed and, in the case of a leak, easily replaced or repaired.

Wheel rims also come in a variety of diameter and widths to provide optimum performance for different uses. For example, high performance road racing rims are relatively narrow, e.g. 18 mm, whereas wider touring or durable off-road tires usually require rims that are 24 mm wide or more.

Fitting a tyre to a rim, for example, after a puncture or when simply fitting a new tube, conventional tyre levers are utilised to pry a bead section of the tyre away from the rim and then lift (lever) this bead section over and out of the rim. The other end of the tyre lever is then hooked around a spoke to keep the tyre bead free from the rim and allowing a second tyre lever to lift another bead section over and away from the rim. In some cases it is necessary to utilise additional tyre levers until the tyre can be fully removed from the rim.

As described earlier, the bead of a tyre usually includes a wire or aramid fibres, which makes the bead relatively rigid in structure. Consequently, a considerable force has to be generated to stretch the bead over the rim section. The required stretch is also increased by the thickness of the tyre lever, which must also be overcome when lifting the bead section over the rim.

FIG. 1 illustrates a typical bicycle wheel 10 having a rim 12, spokes 14 and a tyre 16 with an inflatable tube (not shown) inside the tyre. FIG. 2(*a*) illustrates a cross section of the wheel 10 shown in FIG. 1 with the tyre 16 and inner tube 18 installed on the rim 12. The tyre bead 20 is engaged with a groove running around the inner wall of the rim flanges 24 so as to secure the tyre 16 to the rim 12. FIG. 2 (*b*) illustrates a cross section of another "clincher"-type wheel where part of the tyre bead 20 is moved out of the rim 12.

Typically, the bead 20 of a tyre 16 is fitted to the rim 12 by utilising a simple lever 30 that is "wedged" between the inside of the rim flange 24 and the tyre bead 20. As shown in FIG. 3(*a*), the contact point between the tyre lever 30 and the flange 24 forms a fulcrum for the tyre lever 30, allowing sufficient force to be generated at the tyre lever end to stretch and lift the bead section 20 over the flange 24.

However, there is a very high risk that the inner tube 18 is severely damaged (e.g. pinched) when this conventional tyre lever 30 is pushed between the inside of the flange 24 and the underside of the tyre bead 20. Also, the considerable force required to stretch the "wired" bead 20 over the rim 24 may break the tyre lever 30, possibly constructed to be relatively thin and made from a "weaker" material (i.e. plastic) potentially causing injuries to the user or simply rendering the tyre lever inoperative. Structurally stronger tyre levers made form metal may be bent in the process, again potentially causing injuries.

As shown in FIG. 3(*b*), when removing or refitting a tyre 16 from the rim 12 using conventional tyre levers 30, additional tyre levers 30 have to be employed to step by step move all of the tyre bead 20 out of engagement with the rim 12. Utilising a plurality of conventional tyre levers 30 further increases the risk of causing damage to the inner tube or injury to the user.

Accordingly, it is an object of the present invention to provide an improved tool for mounting of a tyre onto its rim, as well as, removing of a tyre from its rim, and in particular, for installing a bicycle tyre to a "clincher"-type rim without the disadvantages of conventional tyre levers.

SUMMARY OF THE INVENTION

Preferred embodiments of the invention seek to overcome one or more of the above disadvantages of the prior art.

According to a first aspect of the present invention, there is provided a tool for installing and removing a tyre having a bead, comprising a substantially elongated body member having a longitudinal axis, the body member further comprising:

a handle portion, arranged in line with said longitudinal axis;

a first engagement portion, arranged at a first end of said handle portion, adapted to operably engage with a first rim flange of opposed first and second rim flanges of a wheel, so as to form a fulcrum on the contact point between said first engagement portion and the first flange;

a second engagement portion, spaced apart at a predetermined distance in a direction away from said first engagement portion along said longitudinal axis, adapted to abuttingly engage with a rim-overlapping bead portion of a tyre, so as to move the bead portion over the second rim flange into the space between the opposed first and second rim flanges during use;

a bridge portion, operably linking said first engagement portion and said second engagement portion, adapted to accommodate a predetermined range of cross-sectional profiles of a tyre during use, and wherein said first engagement portion comprises a first planar contact surface facing towards said second engagement portion and which is arranged at a predetermined angle with respect to said longitudinal axis.

This provides the advantage that the lever is not required to be "wedged" between the bead section and the inside of the rim flange removing the risk of accidentally "pinching" the inner tube during installation or removal of the tyre. In addition, since the lever fulcrum is located on the other rim flange, i.e. opposite the rim flange over which the bead section has to be lifted, there is no need to stretch the bead over the rim flange and thickness of the tyre ever (which would be wedged between the flange and the bead), thus reducing the force required to lift the bead section over the rim flange. Furthermore, since the fulcrum of the lever is now further away from the point of contact with the bead section, the required force applied to the handle portion by the user is further reduced.

Moreover, the cross sectional profile of common tyre levers has to be relatively thin to allow the lever to be wedged between the rim flange and the bead and to minimise the additional stretch required to lift the bead over the rim flange. Consequently, the relatively thin cross sectional profile of common tyre levers greatly compromises the structural strength and provides an increased risk of breaking the lever during use. On the other hand, the tool of the present invention provides the advantage that any cross sectional profile may be used, so as to provide sufficient structural strength minimising the risk of breaking (or bending) the lever during use. In addition, because the first planar contact surface is angled with respect to the longitudinal axis of the lever, the tool can be applied to range of different rim widths without the need for adjustment of the tool, i.e. the fulcrum is simple shifted up or down the angled first planar contact surface.

Preferably, the second engagement portion may comprise a lip portion projecting towards said first engagement member. Advantageously, the lip portion may further comprise a second planar contact surface arranged substantially perpendicular with respect to the outer surface of the second flange when contacting the outer surface of the flange during use.

This provides the advantage that when the lip portion engages with the bead section in such a way as to push the bead section towards the upper edge of the rim flange, where the bead section can then easily slide from the planar contact surface inside the rim as soon as the planar contact surface reaches the upper edge of the rim flange, thus minimising the required stretch of the bead section.

Preferably, the bridge portion may be of arcuate shape.

Advantageously, the first engagement portion may further comprise at least one interchangeable contact surface member, having a third planar contact surface, and which is adapted to be removably secured to said first engagement portion.

This provides the advantage that different contact surface materials can be used with different rim materials so as to minimise or even prevent any damage caused by the contact between the lever and the flange of the rim. In particular, a relatively soft contact surface member may be used for a carbon-fibre rim, wherein a harder contact surface member may be more advantageous when used with a metal or aluminium rim. The material of the interchangeable contact surface member may be selected with regards to its hardness in respect to the rim and/or its contact properties when engaging with the rim.

Preferably, the third planar contact surface may be arranged at said predetermined angle with respect to said longitudinal axis when said at least one interchangeable contact surface member is secured to said first engagement portion.

Advantageously, the at least one interchangeable contact surface member further may comprise a mounting portion adapted to demountably engage with said first engagement portion.

In one embodiment, the mounting portion may comprise any one of a clip mechanism and/or a sliding guide mechanism adapted to attachingly engage with a respective clip retaining recess provided at said first engagement portion.

In another embodiment, the mounting portion may comprise an adhering member adapted to attachingly engage with a respective adhering member attached to said first planar contact surface of said first engagement portion.

Preferably, the at least one interchangeable contact surface member may be made from a material that is structurally softer than the material of the engaged first and second rim flanges of a wheel.

Even more preferably, the handle portion, said first engagement portion, said second engagement portion and said bridge portion are integral parts of said body member.

Alternatively, the tool of the present invention may further comprise at least one adjustment mechanism adapted to selectively move said first engagement portion and/or said second engagement portion, so as to increase or decrease said predetermined distance between said first engagement portion and said second engagement portion. Advantageously, the at least one adjustment mechanism may be operably coupled within said bridge portion and/or between said first engagement portion and said handle portion. Preferably, the adjustment mechanism comprises a selectively lockable screw-type mechanism. Alternatively, the adjustment mechanism comprises a selectively lockable pivot joint. Even more alternatively, the adjustment mechanism comprises a ratchet-type mechanism.

This provides the advantage that a single tool of the present invention may be used for a predetermined range of different rim widths.

Advantageously, the tool of the present invention may further comprise a third engagement portion that is arranged at a second end of said handle portion, and which is adapted to cooperatively engage with a bead portion of a tyre, located within a rim of the wheel, and the adjacent flange portion of the rim, so as to lever the bead portion up and over the flange portion and move the bead portion out of the rim during use.

Preferably, the third engagement portion may comprise a first recess adapted to matingly engage with the flange portion of the rim so as to form a fulcrum, and a second recess adapted to hookingly engage with the bead portion of the tyre. Advantageously, said first recess and said second recess are located on opposite corners of said second end of said handle portion forming a lever between said first and second recess when said first recess is engaged with the flange portion of the rim. Preferably, said first recess and said second recess are substantially semi-circular notches.

Alternatively, the third engagement portion may comprise an inclined surface adapted to move the bead portion of a tyre up and over the flange portion when moving said inclined surface towards a predetermined direction along the flange portion of the rim. Preferably, the inclined surface may be provided by two opposing grooves on opposite surfaces of said third engagement portion so as to form a wedge with a double-concave cross-section. Even more preferably, the predetermined direction may be towards the tapered end of said wedge.

Advantageously, said substantially elongated body member may be made of a rigid material. Preferably, said rigid material may be a plastic material.

BRIEF DESCRIPTION OF THE DRAWINGS

Preferred embodiments of the present invention will now be described, by way of example only and not in any limitative sense, with reference to the accompanying drawings, in which:

FIG. 1 shows a typical bicycle wheel, where part of the tyre is moved out of the rim;

FIG. 2 shows (a) a cross sectional view of a typical "clincher"-type bicycle wheel having a "clincher" rim, a tyre with its bead sections engaged with respective rim flanges and an inner tube pressing against the inside wall of the tyre, and (b) a cross sectional view of another "clincher"-type bicycle wheel where the tyre bead section on one side is moved out of the engagement with the rim;

FIG. 8 shows another alternative second embodiment of the tool of the present invention comprising a selectively lockable ratchet-type mechanism so as to allow adjustment of the width between the first and second engagement portion;

DETAILED DESCRIPTION OF THE PREFERRED EMBODIMENT(S)

The exemplary embodiments of this invention will be described in relation to bicycle tyres. However, it should be appreciated that, in general, the tool will work equally well for any other wheel having a "clincher"-type rim and a beaded tyre.

Figure 3A:
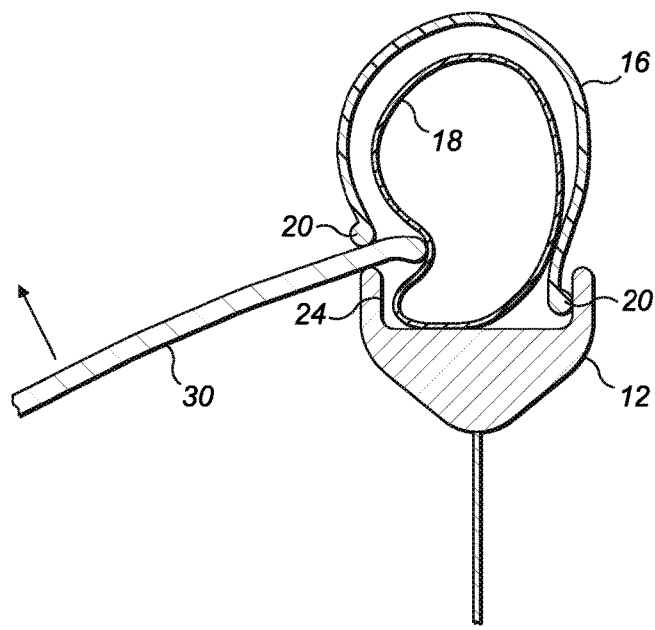
FIG. 3 shows (a) a cross sectional view of a typical tyre lever engaged in moving (i.e. levering) the bead section of the tyre back on to the rim, and (b) a side view of the wheel and a plurality of typical tyre levers engaged between the rim and the bead section of the tyre.
Figure 3B:
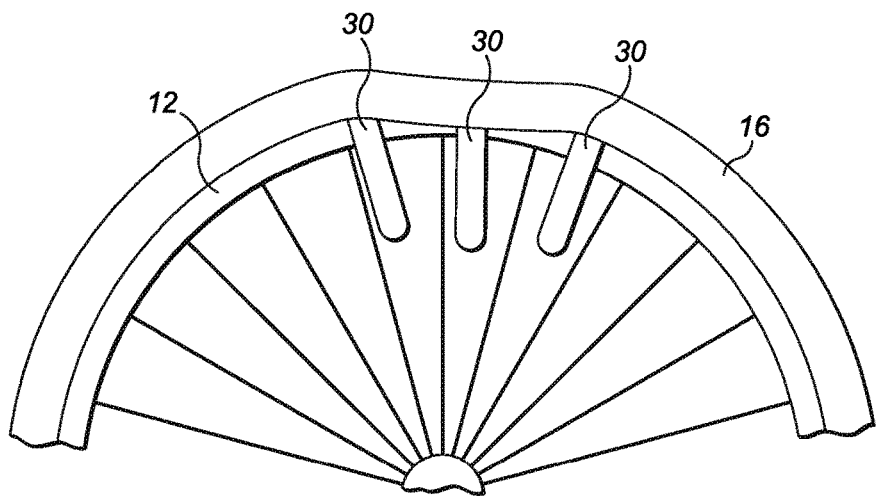
Figure 4A:
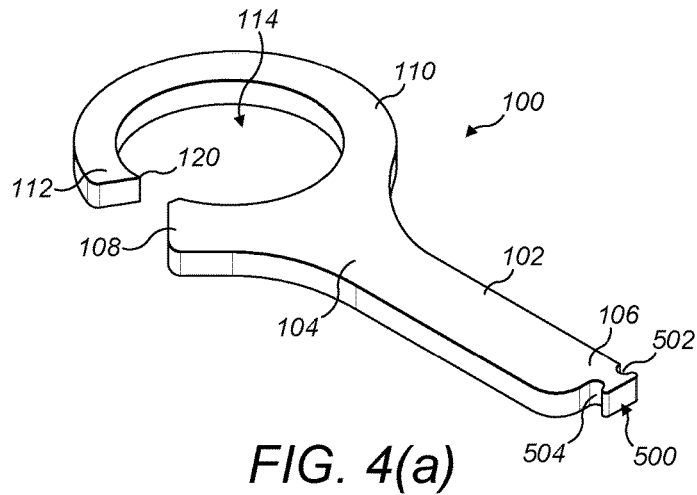
FIG. 4 shows (a) a perspective view and (b) a side view of a first embodiment of the tool of the present invention, and (c) a schematic illustration of the tool when engaging a first rim (Fulcrum) and the outside bead section of the tyre before moving the bead section of the tyre into the rim of the wheel.
Figure 4B:
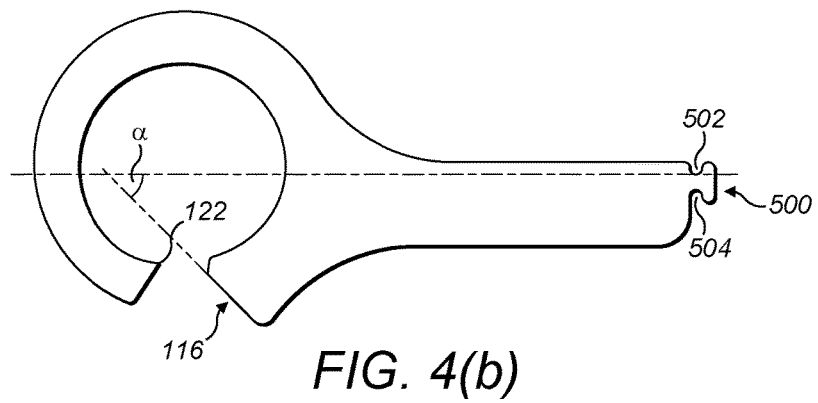

Referring now to FIGS. 4(a), (b) and (c), a first embodiment of the tool 100 of the present invention is made from a single piece of a rigid material. Preferably, and in order to minimise weight and manufacturing costs, the tool 100 is made from plastic. However, it is understood by the person skilled in the art that any suitably rigid material, e.g. metal, or composite material may be used.

The tool 100 of the first embodiment comprises a handle portion 102 having a first end 104 and a second end 106. The first end 104 seamlessly merges into a first engagement portion 108 and bridge portion 110. The other end of the bridge portion 110 comprises a second engagement portion 112 located opposite and spaced apart from the first engagement portion 108.

The recess area 114 defined by the arcuate bridge portion 110 is dimensioned to accommodate the profile of a wheel 10 and installed tyre 16 during use. The first engagement portion 108 defines a planar surface 116 whose planar orientation is inclined with respect to the longitudinal axis 118 of the tool 100. The angle α between the planar surface 116 and the longitudinal axis is an acute angle suitable to be operably placed onto the top of the rim flange 24, so as to provide a fulcrum for the tool 100. Preferably the angle α is within the range of 20° to 60°. Even more preferably, the angle α is 39°.

The second engagement portion 112 comprises a lip portion 120 projecting towards the planar surface 116 of the first engagement portion 108. In this particular example, first and second engagement portion 108, 112 are arranged in line with the circumference of the arcuate bridge portion 110. However, it is understood by the person skilled in the art that that bridge portion may be of any shape (e.g. rectangular) suitable to accommodate a wheel 10 and installed tyre 16 during use. The lip portion 120 further comprises a substantially planar contact surface 122 adapted to engage the bead section 20 from below during use. Preferably, the planar contact surface 122 is arranged substantially perpendicular to the outer surface of the flange 24 when in use (i.e. when the planar surface 116 is placed on the first flange 24 and the lip portion 120 is contacting the outer surface of the opposite second flange 24). Alternatively, the lip portion 120 may comprise a slightly hooked end so as to provide a more secure grip on the bead section 20 during the engagement.

In addition, first and second engagement portion 108, 112 are generally spaced apart in a direction along the longitudinal axis 118 by a distance suitable for a predetermined range of rim widths. For example, the closest distance between the lip portion 120 and the planar surface 116 may be 15 mm. Since the planar surface 116 is orientated at an angle α with respect to the longitudinal axis 118 of the tool 100, the tool 100 can be used on a specific range of rim widths. Alternatively, a tool 100 having a different distance between the lip portion 120 and the planar surface 116 may be provided to accommodate a different range of rim widths and tyre sizes.

Figure 4C:
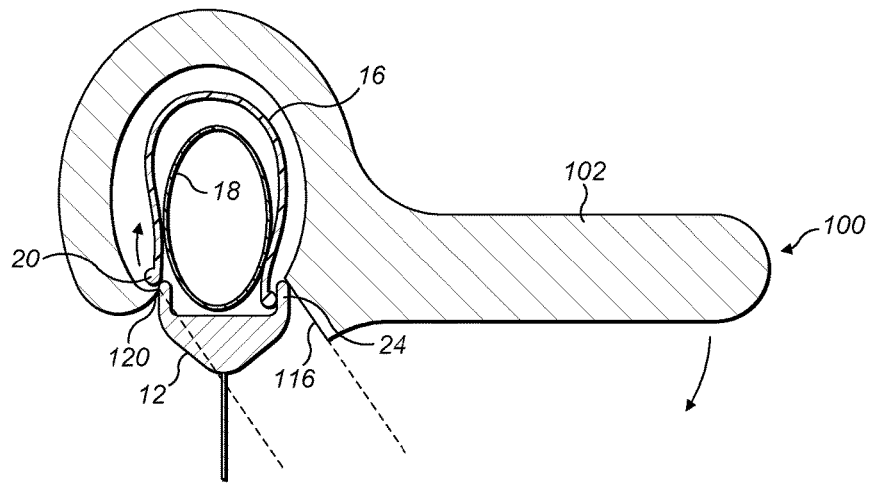

As illustrated in FIG. 4(c), after the tyre bead 20 has been moved out of the rim 12, for example, to replace or repair the inner tube, the lip portion 120 is "hooked" under the bead section 20 located outside the rim 12 and the planar surface 116 of the tool 100 is placed on the opposite flange 24 where the tyre bead 20 is positioned inside the rim 12. The user then pushes the handle portion 102 down rotating the tool 100 about the fulcrum formed by the planar surface 116 contacting the top of the flange 24 and the planar contact surface 122 of the lip portion 120 moved up along the outside surface of the flange 24 lifting the bead section 20 towards the top edge of the flange 24. As soon as the planar surface 116 aligns with the top edge of the flange 24, the bead section 20 can slide over the edge of the flange 24 inside the rim 12. There is no need to stretch the bead 20 any further than up to the edge of the flange 24, therefore reducing the force applied to the handle portion 102 to an absolute minimum necessary to lift the bead up and over the flange 24 into the rim 12. During this process, there is no contact between the tool 100 and the inner tube 18, eliminating the risk of damaging the inner tube 18 when installing the tyre 16 onto the rim 12.

Figure 5:
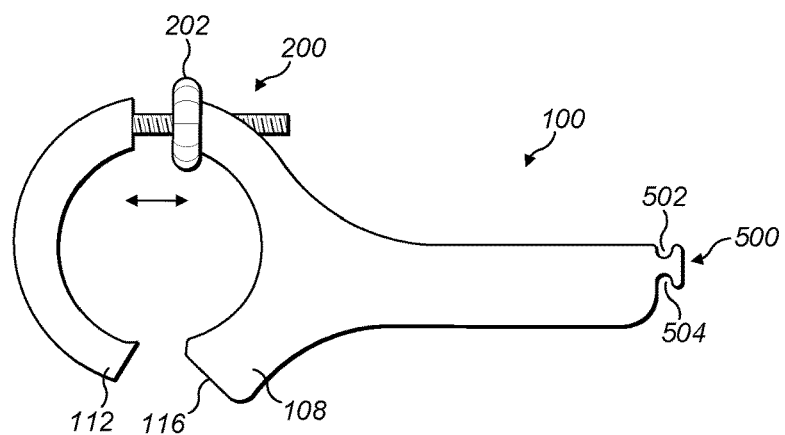
FIG. 5 shows a second embodiment of the tool of the present invention comprising, a screw mechanism at the bridge portion so as to allow adjustment of the width between the first and second engagement portion.

Referring now to FIGS. 5, 6, 7 and 8 a second embodiment of the tool of the present invention further comprises an adjustment mechanism 200, 300, 400, 600 that is adapted to increase or decrease the distance between the first engagement portion 108 and the second engagement portion 112, therefore, providing a single tool 100 that can accommodate an increased range of rim widths and tyre sizes. As shown in FIG. 5, the adjustment mechanism 200, a screw-type spacer mechanism, is incorporated into the bridge portion 110 of the tool 100. When moving the dial 202 of the screw-type spacer mechanism 200, the part of the bridge portion 110 and the second engagement portion 112 is linearly away or towards the first engagement portion 108, consequently increasing or decreasing the distance between the first engagement portion 108 and the second engagement portion 112. Preferably, the adjustment mechanism 200 further comprises a lock (not shown) adapted to lock the adjustment mechanism 200 in place once a desired width is set.

Figure 6:
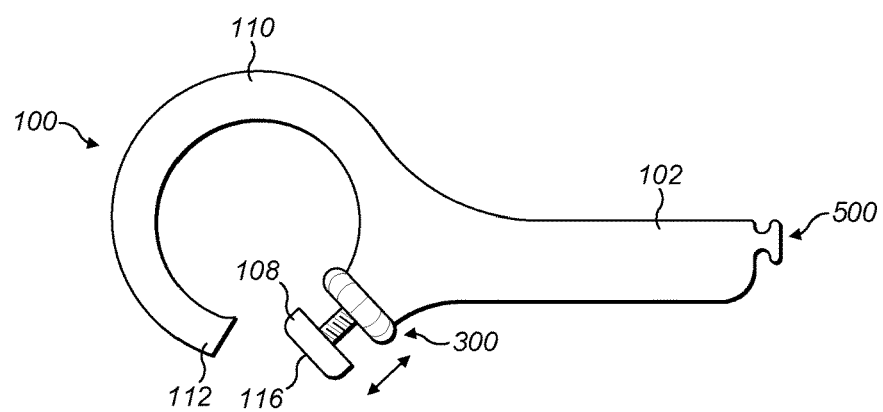
FIG. 6 shows an alternative second embodiment of the tool of the present invention, comprising a screw mechanism between the handle portion and the first engagement portion so as to allow adjustment of the width between the first and second engagement portion.

Alternatively, and as illustrated in FIG. 6, the adjustment mechanism 300 may be installed between the first engagement portion 108 and the handle portion 102 and/or bridge portion 110, allowing, for example, the planar surface 116 to be moved toward or away from the handle-/bridge portion 102, 110, thus increasing or decreasing the distance between the first engagement portion 108 and the second engagement portion 112.

Figure 7:
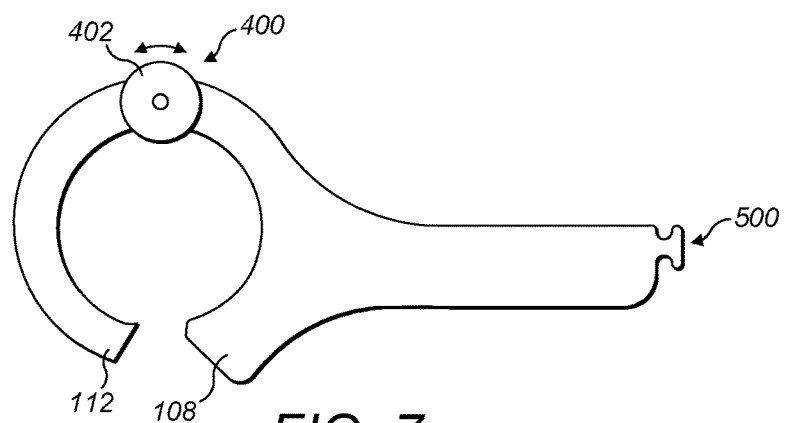
FIG. 7 shows another alternative second embodiment of the tool of the present invention comprising a selectively lockable pivot joint so as to allow adjustment of the width between the first and second engagement portion.

As illustrated in FIG. 7, in yet another alternative second embodiment of the present invention, the adjustment mechanism 400 may be a lockable pivot joint 402 pivotably coupling a first and second part of the bridge portion 110. In order to increase or decrease the distance between the first engagement portion 108 and the second engagement portion 112, at least one of the two halves of the bridge portion 110 is/are rotated about the pivot joint 402 and locked into place once a desired distance between the first engagement portion 108 and the second engagement portion 112 is reached.

As illustrated in FIG. 8, in yet another alternative second embodiment of the present invention, the adjustment mechanism 600 may be a ratchet-type mechanism 602 coupling a first part 110A and second part 110B of the bridge portion 110. A spring-loaded actuator 604 may lock the "saw-toothed" first part 110A of the bridge portion 110 in a desired position, wherein upon actuation of the actuator 604, the first part 110A of the bridge portion 110 may be moved so as to increase or decrease the distance between the first engagement portion 108 and the second engagement portion 112.

It is understood by the person skilled in the art that the present invention is not limited to the specific examples of adjustment mechanisms described herein, and that any suitable mechanism may be utilised to vary the distance between the first engagement portion 108 and the second engagement portion 112.

As illustrated in FIGS. 4 to 7, the tool 100 of the present invention further comprises a third engagement portion 500 suitable for moving a bead section 20 out of engagement with a rim 12. The third engagement portion 500 is located at a second end of the handle portion 102, comprising a first recess 502, adapted to matingly engage with the top edge of a flange 24, and a second recess 504 spaced apart from the first recess 502 in a direction perpendicular to the longitudinal axis 118 and adapted to hookingly engage with a bead 20 of a tyre 16. The distance between the first and second recess 502, 504 is part of a lever formed by the tool 100 and the fulcrum on the first recess 502 to move the bead 20 up and over the rim 12.

Figure 9A:
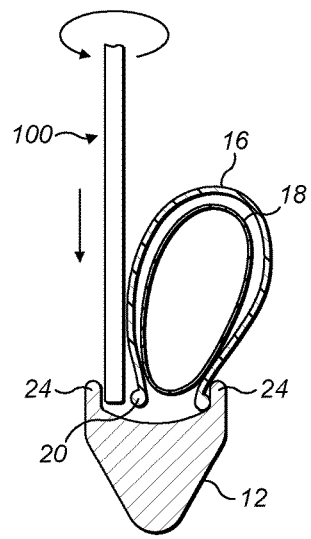
FIG. 9 shows a schematic illustration of the third engagement portion of the tool of the present invention, where (a) the third engagement portion is moved sideways between the tyre bead section and the rim, (b) rotated by 90° so that the first and second notch engage with respective rim portion and bead, and (c) the tool is pivoted about the first notch (pivotably engaged with the rim portion) to "lever" the bead section outside the rim.
Figure 9B:
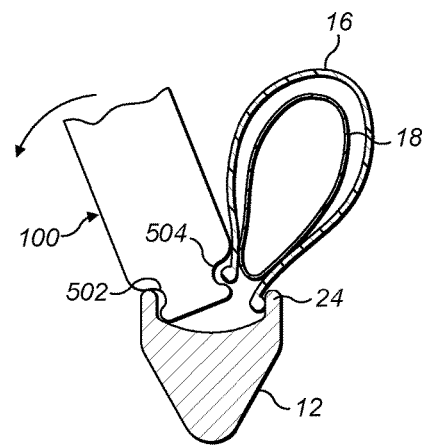
Figure 9C:
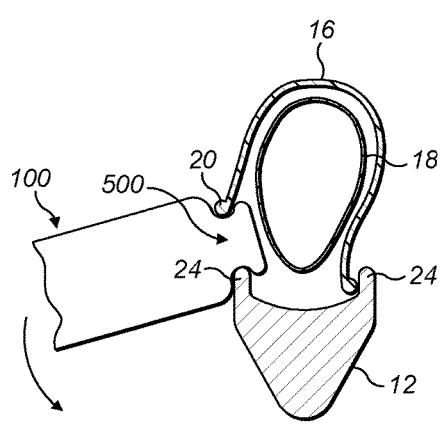
Figure 10A:
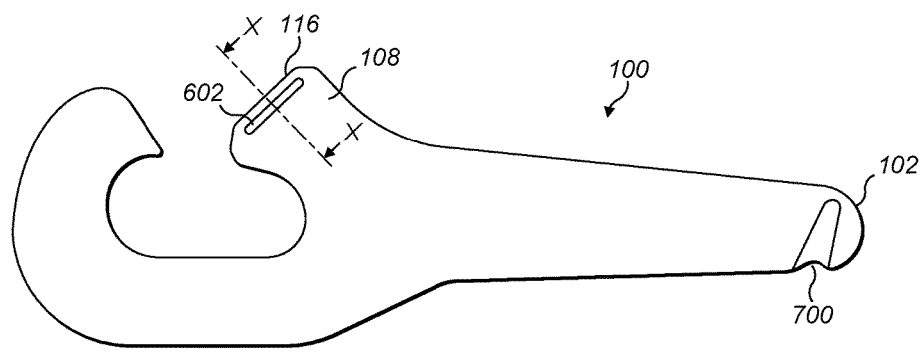
FIG. 10 shows (a) a third embodiment of the tool of the present invention comprising (b) an interchangeable contact surface member that can be demountably attached to the first engagement portion, (c) e.g. by sliding the contact surface member onto a grooved section (cross section through x-x) of the first engagement portion, (d) shows the tool with the attached contact surface member.
Figure 10B:
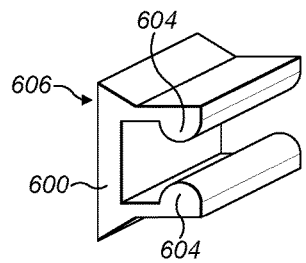
Figure 10C:
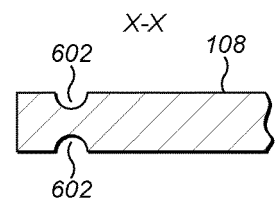
Figure 10D:
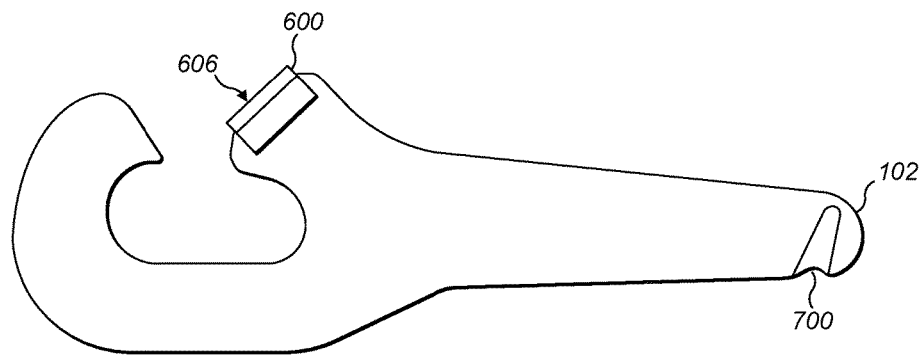

FIGS. 9(a), (b) and (c) illustrate how the third engagement portion 500 of the tool 100 is applied to remove the bead 20 out of the rim 12. In the first step, the deflated tyre 16 is pushed to one side of the rim 20 and the tool 100 is inserted sideways into the opened space between the tyre bead 20 and the flange 24. The tool 100 is then rotated (ca. 90°) about the longitudinal axis 118 so that the first recess 502 engages with the flange 24 of the rim 12 and the second recess 504 engages with the bead 20 of the tyre 16. The user then pushed the handle portion 102 down so as to rotate the tool 100 about the fulcrum formed by the first recess 502 and the contact point with the flange 24. The distance between the first and second recess 502, 504 acts as a lever to lift the bead 20 up and over the flange 24 of the rim 12.

Contrary to conventional tyre levers, where the fulcrum of the lever is formed simply by placing the lever onto the flange 24 (potential slip during use) and the end of the lever simple slides under the bead 20, the second recess 504 provides an improved grip onto the bead section 20 and the first recess 502 provides a more secure fulcrum on the flange 24 during use, allowing a greater section of the bead to be moved out of the rim and minimising any slippage of the fulcrum during use. The first and second recess 502, 504 may be semi-circular notches on each corner of the handle portion 102, wherein the notches are formed so as to avoid any sharp edges that may damage the inner tube during use.

Referring now to FIG. 10, a third embodiment of the tool 100 of the present invention is disclosed, where an interchangeable contact surface member 600 is demountably attached to the first engagement portion 108, so as to allow different surface material to be used with different rims 12 (e.g. carbon, aluminium, steel etc.), therefore, potentially minimising any damage to the rim 12 caused by the contact with the tool 100. For example, the user may attach a "softer" contact surface member 600 when applying the tool 100 to a carbon rim 12, wherein the user may attach a harder and/or "stickier" contact surface member 600 when applying the tool 100 to a steel or aluminium rim 12. The interchangeable contact surface member 600 also provides the advantage that a contact surface 116 showing damage or any signs of wear and tear is simply replaced by a new contact surface member 600, without having to replace the whole tool 100.

The contact surface member 600 may be attached to the first engagement portion 108 via a "clip & groove" mechanism, where grooves 602 are arranged at opposite surfaces of the first engagement portion 108 and each groove 602 adapted to receive a respective lip portion 604 of the contact surface member 600, either by sliding the contact surface member 600 onto the first engagement portion 108, or by clipping the contact surface member 600 into the respective grooves 602 of the first engagement portion 108. Alternatively, the contact surface member 600 may be attached to the first engagement portion 108 using an adhering mechanism, such as, for example, a magnetic surface that attaches to a metal surface of the first engagement portion 108, or a hook & loop type mechanism may be utilised to attach the contact surface member 600 (e.g. hooks) to the first engagement portion 108 (e.g. loops). However, it is understood by the person skilled in the art, that any suitable demountable attachment mechanism can be used to removably attach the contact surface member 600 to the first engagement portion 108. Also, any suitable shape and form of the interchangeable contact surface member 600 may be used to demountably attach to the first engagement portion 108.

During use, the outer contact surface 606 of the contact surface member 600 aligns with the contact surface 116 of the first engagement portion 108 so that the outer contact surface 606 is arranged at the same predetermined angle α as the contact surface 116 of the first engagement portion 108.

The contact surface member 600 may be colour coded according to its structural properties (e.g. hardness, adherence), so that the user can easily differentiate between the different contact surface members 600 and chose the appropriate one for a specific rim material.

Figure 11:
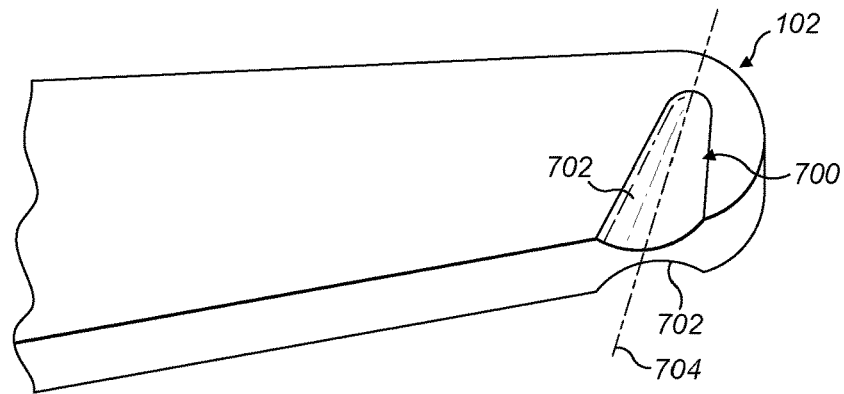
FIG. 11 shows an alternative embodiment of the third engagement portion of the tool of the present invention, where an inclined surface, produced by two converging grooves, is used to slide the bead up and over a rim.

Referring now to FIGS. 10 and 11, an alternative third engagement portion 700 of the tool 100 is disclosed. The alternative third engagement portion 700 is suitable for moving a bead section 20 out of engagement with a rim 12. The alternative third engagement portion 700 is located at the second end of the handle portion 102, comprising two opposing inclined surfaces 702 arranged generally transverse with respect to the longitudinal axis 118 on respective surfaces of the handle portion 102. The two opposing inclined surfaces 702 are arranged so as to converge towards one edge of the handle portion 102, i.e. forming a "wedge". In this particular example, the inclined surfaces 702 are formed by two opposing grooves cut into respective surfaces of the handle portion 102.

In addition, the angular alignment of the longitudinal axis 704 of one groove 702 may be offset with respect to the angular alignment of the longitudinal axis of the other groove 702 (when viewed with regards to the longitudinal axis 118 of the tool 100), so that, during use, the bead portion 20 of the tyre is not only pushed up, but also out and away from the rim flanges 24, while the other groove 702 functions as a guide sliding on the rim flange 24 of the wheel. In addition, the third engagement portion 700 may also be tapered towards the end of the handle portion 102 so as to facilitate sliding the third engagement portion 700 between the rim flange 24 and the bead portion 20 of the tyre.

When removing a tyre 16, the third engagement portion 700 is pushed in a space between the rim flange 24 and the bead portion 20 so that the lower groove 702 is in contact with the top of the rim flange 24. The handle portion 102 is then pivoted about the contact point of the lower groove 702 to lift the bead portion 20 into the upper groove 702. The handle portion 102 is then slid on the rim flange 24 in a direction towards the tapered edge of the two inclined surfaces 702, therefore sliding the bead portion up and out of engagement with the rim flange 24.

Figure 12:
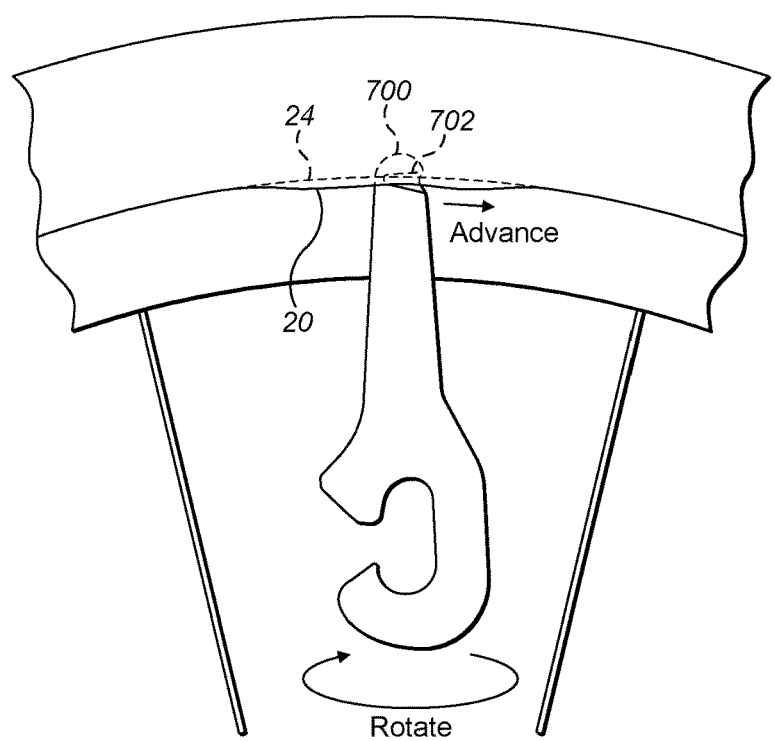
FIG. 12 shows that during tyre removal, portion 700 may be rotated about the long axis of the lever such that the leading edge of groove 702 lifts a portion of the tyre bead 20 over the flange of the wheel rim 24 in advance of portion 700, such that the lever may be easily advanced around the circumference of the wheel. During this operation the opposite end of the lever is used as a handle and provides extra torque and leverage to assist in tyre removal.

Referring now to FIG. 12, the tool 100 is illustrated during tyre removal, where the portion 700 may be rotated about the longitudinal axis of the tool 100 such that the leading edge of groove 702 lifts a portion of the tyre bead 20 over the rim flange 24 of the wheel 10 in advance of portion 700, allowing the lever to be moved easily around the circumference of the wheel rim 24. It is understood by the person skilled in the art that the opposite end portion of the lever tool 100 is used as a handle providing additional torque and leverage to assist the user when removing the tyre.

It will be appreciated by persons skilled in the art that the above embodiment has been described by way of example only and not in any limitative sense, and that various alterations and modifications are possible without departing from the scope of the invention as defined by the appended claims.

The invention claimed is:

1. A tool for installing and removing a tyre having a bead, comprising a substantially elongated body member having a longitudinal axis, the body member further comprising:
 a handle portion, arranged in line with said longitudinal axis;
 a first engagement portion, arranged at a first end of said handle portion, adapted to operably engage with a first flange of opposed first and second rim flanges of a wheel, so as to form a fulcrum on the contact point with the first flange;
 a second engagement portion, spaced apart at a predetermined distance in a direction away from said first engagement portion along said longitudinal axis, adapted to abuttingly engage with a rim-overlapping bead portion of a tyre, so as to move the bead portion over the second flange of the opposed first and second rim flanges during use; and
 a bridge portion, operably linking said first engagement portion and said second engagement portion, adapted to accommodate a predetermined range of cross-sectional profiles of a tyre during use,
 wherein said first engagement portion comprises a first planar contact surface facing towards said second engagement portion and which is arranged at a predetermined angle with respect to said longitudinal axis, and
 wherein said second engagement portion comprises a lip portion projecting towards said first engagement member, and said lip portion further comprises a second planar contact surface arranged substantially perpendicular with respect to the outer surface of the second flange when contacting the outer surface of the flange during use.

2. A tool according to claim 1, wherein said bridge portion is of arcuate shape.

3. A tool according to claim 1, wherein said handle portion, said first engagement portion, said second engagement portion and said bridge portion are integral parts of said body member.

4. A tool according to claim 3, wherein said at least one adjustment mechanism is operably incorporated within said bridge portion and/or between said first engagement portion and said handle portion.

5. A tool according to claim 1, further comprising a third engagement portion arranged at a second end of said handle portion, adapted to cooperatively engage with a bead portion of a tyre located within a rim of a wheel and an adjacent flange portion of a rim, so as to lever the bead portion up and over the flange portion and move the bead portion out of the rim during use.

6. A tool according to claim 5, wherein said third engagement portion comprises an inclined surface adapted to move the bead portion of a tyre up and over the flange portion when moving said inclined surface towards a predetermined direction along the flange portion of the rim.

7. A tool for installing and removing a tyre having a bead, comprising a substantially elongated body member having a longitudinal axis, the body member further comprising:

a handle portion, arranged in line with said longitudinal axis;

a first engagement portion, arranged at a first end of said handle portion, adapted to operably engage with a first flange of opposed first and second rim flanges of a wheel, so as to form a fulcrum on the contact point with the first flange;

a second engagement portion, spaced apart at a predetermined distance in a direction away from said first engagement portion along said longitudinal axis, adapted to abuttingly engage with a rim-overlapping bead portion of a tyre, so as to move the bead portion over the second flange of the opposed first and second rim flanges during use; and a bridge portion, operably linking said first engagement portion and said second engagement portion, adapted to accommodate a predetermined range of cross-sectional profiles of a tyre during use, wherein said first engagement portion comprises a first planar contact surface facing towards said second engagement portion and which is arranged at a predetermined angle with respect to said longitudinal axis, and wherein said first engagement portion further comprises at least one interchangeable contact surface member, having a third planar contact surface, and which is adapted to be removably secured to said first engagement portion.

8. A tool according to claim 7, wherein said third planar contact surface is arranged at said predetermined angle with respect to said longitudinal axis when said at least one interchangeable contact surface member is secured to said first engagement portion.

9. A tool according to claim 7, wherein said at least one interchangeable contact surface member further comprises a mounting portion adapted to demountably engage with said first engagement portion.

10. A tool according to claim 9, wherein said mounting portion comprises any one of a clip mechanism and/or a sliding guide mechanism adapted to attachingly engage with a respective clip retaining recess provided at said first engagement portion.

11. A tool according to claim 9, wherein said mounting portion comprises an adhering member adapted to attachingly engage with a respective adhering member attached to said first planar contact surface of said first engagement portion.

12. A tool for installing and removing a tyre having a bead, comprising a substantially elongated body member having a longitudinal axis, the body member further comprising:

a handle portion, arranged in line with said longitudinal axis;

a first engagement portion, arranged at a first end of said handle portion, adapted to operably engage with a first flange of opposed first and second rim flanges of a wheel, so as to form a fulcrum on the contact point with the first flange;

a second engagement portion, spaced apart at a predetermined distance in a direction away from said first engagement portion along said longitudinal axis, adapted to abuttingly engage with a rim-overlapping bead portion of a tyre, so as to move the bead portion over the second flange of the opposed first and second rim flanges during use;

a bridge portion, operably linking said first engagement portion and said second engagement portion, adapted to accommodate a predetermined range of cross-sectional profiles of a tyre during use; and at least one adjustment mechanism adapted to selectively move said first engagement portion and/or said second engagement portion so as to increase or decrease said predetermined distance between said first engagement portion and said second engagement portion, wherein said first engagement portion comprises a first planar contact surface facing towards said second engagement portion and which is arranged at a predetermined angle with respect to said longitudinal axis, and wherein said adjustment mechanism comprises any one of a selectively lockable screw-type mechanism and/or a selectively lockable pivot joint and/or a selectively lockable ratchet-type mechanism.

13. A tool for installing and removing a tyre having a bead, comprising a substantially elongated body member having a longitudinal axis, the body member further comprising:

a handle portion, arranged in line with said longitudinal axis;

a first engagement portion, arranged at a first end of said handle portion, adapted to operably engage with a first flange of opposed first and second rim flanges of a wheel, so as to form a fulcrum on the contact point with the first flange;

a second engagement portion, spaced apart at a predetermined distance in a direction away from said first engagement portion along said longitudinal axis, adapted to abuttingly engage with a rim-overlapping bead portion of a tyre, so as to move the bead portion over the second flange of the opposed first and second rim flanges during use;

a bridge portion, operably linking said first engagement portion and said second engagement portion, adapted to accommodate a predetermined range of cross-sectional profiles of a tyre during use, and a third engagement portion arranged at a second end of said handle portion, adapted to cooperatively engage with a bead portion of a tyre located within a rim of a wheel and an adjacent flange portion of a rim, so as to lever the bead portion up and over the flange portion and move the bead portion out of the rim during use;

wherein said first engagement portion comprises a first planar contact surface facing towards said second engagement portion and which is arranged at a predetermined angle with respect to said longitudinal axis, and wherein said third engagement portion comprises a first recess adapted to matingly engage with a flange portion of the rim so as to form a fulcrum, and a second recess adapted to hookingly engage with a bead portion of the tyre.

14. A tool according to claim 13, wherein said first recess and said second recess are located on opposite corners of said second end of said handle portion so as to form a lever between said first and second recess when said first recess is engaged with the flange portion of the rim during use.

15. A tool according to claim 13, wherein said first recess and said second recess are substantially semi-circular notches.

16. A tool for installing and removing a tyre having a bead, comprising a substantially elongated body member having a longitudinal axis, the body member further comprising:

a handle portion, arranged in line with said longitudinal axis;

a first engagement portion, arranged at a first end of said handle portion, adapted to operably engage with a first flange of opposed first and second rim flanges of a wheel, so as to form a fulcrum on the contact point with the first flange;

a second engagement portion, spaced apart at a predetermined distance in a direction away from said first engagement portion along said longitudinal axis, adapted to abuttingly engage with a rim-overlapping bead portion of a tyre, so as to move the bead portion over the second flange of the opposed first and second rim flanges during use;

a bridge portion, operably linking said first engagement portion and said second engagement portion, adapted to accommodate a predetermined range of cross-sectional profiles of a tyre during use, and a third engagement portion arranged at a second end of said handle portion, adapted to cooperatively engage with a bead portion of a tyre located within a rim of a wheel and an adjacent flange portion of a rim, so as to lever the bead portion up and over the flange portion and move the bead portion out of the rim during use;

wherein said first engagement portion comprises a first planar contact surface facing towards said second engagement portion and which is arranged at a predetermined angle with respect to said longitudinal axis, and wherein said third engagement portion comprises an inclined surface adapted to move the bead portion of a tyre up and over the flange portion when moving said inclined surface towards a predetermined direction along the flange portion of the rim, and said inclined surface is provided by two opposing grooves on opposite surfaces of said third engagement portion so as to form a wedge with a double-concave cross-section.

17. A tool according to claim 16, wherein said second engagement portion comprises a lip portion projecting towards said first engagement member.

18. A tool according to claim 17, wherein said lip portion further comprises a second planar contact surface arranged substantially perpendicular with respect to the outer surface of the second flange when contacting the outer surface of the flange during use.

19. A tool according to claim 16, wherein said predetermined direction is towards the tapered end of said wedge.

* * * * *